US006231293B1

(12) United States Patent
Ostholt et al.

(10) Patent No.: US 6,231,293 B1
(45) Date of Patent: *May 15, 2001

(54) TIPPING DEVICE FOR EMPTYING CONTAINERS FOR PIECE GOODS

(75) Inventors: Rüdiger Ostholt, Wester; Peter Becker, Ladenburg, both of (DE)

(73) Assignee: Mannesmann Aktiengesellschaft, Duesseldorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/319,793

(22) PCT Filed: Dec. 9, 1997

(86) PCT No.: PCT/DE97/02948

§ 371 Date: Jun. 9, 1999

§ 102(e) Date: Jun. 9, 1999

(87) PCT Pub. No.: WO98/25842

PCT Pub. Date: Jun. 18, 1998

(30) Foreign Application Priority Data

Dec. 9, 1996 (DE) .............................................. 196 52 421
Dec. 4, 1997 (DE) .............................................. 197 55 877

(51) Int. Cl.$^7$ ........................... B65B 21/02; B65B 69/00; B65G 65/04; B65G 65/34
(52) U.S. Cl. ........................................................... 414/418
(58) Field of Search .......................... 198/477, 867.11; 414/404, 418, 4.25

(56) References Cited

U.S. PATENT DOCUMENTS 3,167,193   1/1965   Harrison et al. ........................ 214/62
3,231,066   1/1966   Harrison et al. ........................ 198/155

(List continued on next page.)

FOREIGN PATENT DOCUMENTS

2151439 C2   10/1982   (DE) .............................. B65G/47/46
4225491 C1   10/1993   (DE) .............................. B65G/47/38

(List continued on next page.)

OTHER PUBLICATIONS

U.S. Ser. No. 547,415 filed Jul. 29, 1993.
The attached Exhibit A contains the English translations of the abstracts corresponding to German patent applications DE 42 25 491 C1; DE 44 13 967 A1; DE 21 51 499 C2; 43 42 852 C1; and DE 43 41 715 C1 that were previously filed with the United States Patent Trademark Office as pior art.

Primary Examiner—Christopher P. Ellis
Assistant Examiner—Kenneth W Bower
(74) Attorney, Agent, or Firm—Van Dyke, Gardner, Linn & Burkhart, LLP (57) ABSTRACT

The invention involves a tilting device for emptying containers (2) of mixed-item loads, especially of pieces of airline luggage, which is placed along the course of a conveyor line (3), and at least one branch conveyor is bordering on the conveyor line with tilting arms located one behind the other in the direction of transport. The tilting arms can be swiveled laterally for emptying the containers (2) in each case around an axle (9) running in the direction of transport and horizontal to the extent possible, and at least two tilting arms for passing the containers (2) along between the conveyor lines (3) can be connected in a detachable way with a container (2). In order to create a tilting device for emptying containers that has an optimized operational throughput, it is proposed that the tilting arms are each to be arranged on a chassis (7), the chassis (7) are to be connected through a driven traction mechanism (4) into an endlessly-circulating chain, and the containers (2) are to be capable of being coupled and decoupled for the acceptance of, and the discharge to, the conveyor line through holding devices (20) located on the tilting arms, as well as the containers (2) resting in the coupled state on the movable tilting arms.

43 Claims, 6 Drawing Sheets

U.S. PATENT DOCUMENTS

| | | | |
|---|---|---|---|
| 3,269,520 | 8/1966 | Bishop et al. | 198/155 |
| 3,360,106 | 12/1967 | Harrison et al. | 198/155 |
| 3,463,298 | 8/1969 | Harrison | 198/155 |
| 3,510,014 | 5/1970 | Speaker et al. | 214/62 |
| 3,589,501 | 6/1971 | Harrison | 198/155 |
| 3,662,874 | 5/1972 | Muller | 198/155 |
| 3,669,245 | 6/1972 | Wooten et al. | 198/155 |
| 3,817,368 | 6/1974 | Wentz et al. | 198/21 |
| 3,933,068 | 1/1976 | Rejsa | 83/168 X |
| 4,004,681 | 1/1977 | Clewett et al. | 198/38 |
| 4,031,998 | 6/1977 | Suzuki et al. | 198/365 |
| 4,089,404 | 5/1978 | Venzke | 198/365 |
| 4,139,088 | 2/1979 | Olesen | 198/365 |
| 4,143,751 | 3/1979 | Foster et al. | 198/365 |
| 4,156,335 | 5/1979 | Strobl et al. | 53/444 X |
| 4,174,773 | 11/1979 | Venzke | 198/365 |
| 4,378,062 | 3/1983 | Macrum | 198/365 |
| 4,399,904 | 8/1983 | Canziani | 198/365 |
| 4,413,721 | 11/1983 | Bollier | 198/365 |
| 4,509,635 | 4/1985 | Emsley et al. | 198/365 |
| 4,586,613 | 5/1986 | Horii | 209/556 |
| 4,635,785 | 1/1987 | Prydtz | 198/365 |
| 4,722,430 | 2/1988 | Canziani | 198/365 |
| 4,724,948 | 2/1988 | Adams et al. | 198/474.1 |
| 4,726,464 | 2/1988 | Canziani | 198/365 |
| 4,729,466 | 3/1988 | Bollier et al. | 198/365 |
| 4,744,454 | 5/1988 | Pölling | 198/365 |
| 4,787,498 | 11/1988 | Males et al. | 198/365 |
| 4,846,335 | 7/1989 | Hartlepp | 198/365 |
| 4,856,642 | 8/1989 | Nicholson et al. | 198/365 |
| 4,961,489 | 10/1990 | Warkentin | 198/365 |
| 4,982,828 | 1/1991 | Nicolson et al. | 198/365 |
| 4,984,674 | 1/1991 | Fortenberry | 198/365 |
| 4,989,719 | 2/1991 | Ballestrazzi et al. | 198/365 |
| 5,009,563 | 4/1991 | Case et al. | 414/470 |
| 5,018,928 | 5/1991 | Hartlepp | 414/339 |
| 5,054,601 | 10/1991 | Sjogren et al. | 198/365 |
| 5,086,905 | 2/1992 | Pölling | 198/365 |
| 5,244,074 | 9/1993 | Riemrich | 198/365 |
| 5,255,774 | 10/1993 | Yokoya | 198/365 |
| 5,285,884 | 2/1994 | Polling et al. | 198/365 |
| 5,335,767 | 8/1994 | Killer et al. | 198/365 |
| 5,348,132 | 9/1994 | Maier | 198/365 |
| 5,353,912 | 10/1994 | Killer et al. | 198/365 |
| 5,372,234 | 12/1994 | Fortenbery et al. | 198/365 |
| 5,381,882 | 1/1995 | Ostholt | 198/365 |
| 5,445,080 | 8/1995 | Austin | 104/119 |
| 5,477,955 | 12/1995 | Madden et al. | 198/370.04 |
| 5,489,017 | 2/1996 | Bonnet | 198/370.04 |
| 5,611,419 | 3/1997 | LaVars | 198/370.04 |
| 5,662,206 | 9/1997 | Baum et al. | 198/370.04 |
| 5,664,660 | 9/1997 | Prydtz et al. | 198/370.04 |

FOREIGN PATENT DOCUMENTS

| | | | |
|---|---|---|---|
| 4341715 C1 | 11/1994 | (DE) | B65G/47/38 |
| 4342852 C1 | 11/1994 | (DE) | B65G/47/38 |
| 4413967 A1 | 11/1994 | (DE) | B65G/47/46 |
| 77224 | 12/1997 | (DE) . | |
| 0425021 B1 | 6/1993 | (EP) | B65G/17/34 |
| 2082536 | 3/1982 | (GB) | B65G/17/48 |
| 2114698 | 3/1985 | (GB) | B65G/47/24 |
| 2144698 | 3/1985 | (GB) | B65G/47/24 |
| 97 02948 | 9/1997 | (WO) | B65G/47/38 |

TIPPING DEVICE FOR EMPTYING CONTAINERS FOR PIECE GOODS

BACKGROUND OF THE INVENTION

The invention involves a tilting device for emptying containers of mixed-item loads, especially for pieces of airline luggage, in accordance with the characterizing clause of claim 1.

A tilting device of this type for emptying containers of mixed-item loads is known from DE 44 13 967 A1. This tilting device essentially consists of a multitude of chassis arranged one behind the other in the direction of transport. The chassis are connected with each other into an endlessly-circulating chain and can be moved on rails. In the design example, the chassis can be moved along running rails that are horizontal and put in place in a racetrack shape. A pair of tilting arms is provided on the chassis, spaced apart from one another in each case, viewed in the direction of transport; the tilting arms can be swiveled around an axle running in the direction of transport and are oriented so as to be horizontal, and so as to be V-shaped to each other, viewed in the direction of transport. The ends of the tilting arms turned away from the chassis can be moved towards each other and away from each other, in order to be able to engage with their ends in complementary, recessed grooves in the contact surface of the containers. The containers can be connected with the tilting arms, and consequently with the vehicle, because of this, in order to let the mixed-item load stored in the container to slide laterally down onto the path of travel of the branch conveyors next to the chassis. To pass along the containers from the circulating chassis in the direction of a continuing conveyor line again, the tilting arms are moved towards each other, and the container is consequently detached from the chassis. After this, the container is taken on by the continuing conveyor line. The coupling and decoupling movement of the tilting arms takes place through guide rollers located on the ends of the tilting arms turned away from the container; the guide rollers engage in running rails going in the direction of movement and, in accordance with their course, give rise to a movement of the tilting arms relative to each other. Because the tilting arms are provided with initial tension through a spring in the direction of coupling, the running rails described above are only intended for the decoupling process. It is possible because of this that the container can be simply emptied through a lateral swiveling of the tilting arms, without the guide rollers for the decoupling and coupling process being in the way.

A device for emptying containers that is placed along the course of a conveyor line is known from DE 42 25 491 C1. The containers are preferably for the transport of individual pieces of airline luggage. The emptying device essentially consists of several tilting arms arranged so as to be fixed in place, one behind the other in the direction of transport, and with a spacing between each other. The tilting arms extend out crosswise to the direction of transport and are each supported in their center around an axle running in the direction of transport so as to be capable of swiveling towards both sides. Furthermore, support rollers along the lines of a roller conveyor are provided in the area of the emptying device; the support rollers are arranged in a single row one in back of the other, viewed in the direction of transport, and are disk-shaped. The design of the support rollers and of the underside of the containers, with a central slot going along in the direction of transport, is chosen in such a way that the containers supported by the support rollers can be tilted towards both sides, as far as about 45°, on the support rollers. The tilting movement of the containers takes place through the double-arm tilting arms, in order to permit the pieces of luggage transported by these to slide down on branch conveyors that are laterally bordering on the emptying device. Guides in the form of guide rollers that can be rotated around horizontal axles are provided for this on the opposite ends of the tilting arms. The guide rollers engage in guide lands that are accordingly arranged on the container, in order to transfer the swiveling movement of the tilting arms to the containers. The tilting arms, one behind the other in the transport direction, are at a distance to each other that is less than the length of the containers, so that the containers can be passed along during the tilting process to the subsequent tilting arm in the transport direction, which is in the same tilted position.

This emptying device is suitable for a multitude of applications and distinguishes itself by the fixed arrangement of the tilting arms. The operating throughput of the emptying device is limited, however, by the fact that an adequate gap has to exist between the individual containers to be emptied, so that the tilting arms can right themselves again into the horizontal position out of the swiveled position for taking on the following container.

Another tilting device for mixed-item loads placed in the course of a conveyor line is already known from the German patent document DE 21 51 439 C2, which essentially consists of carrying trays that can be moved in the transport direction and which can be swiveled to the right or to the left side around an axle running in the transport direction for tilting off the mixed-item load. The mixed-item load can consequently be selectively passed along to a neighboring branch conveyor. The carrying trays are each attached through a tilting arm on individual chassis that are arranged one behind the other in the transport direction and connected with each other. The chassis consequently form an endless chain that is guided around a deflection wheel at the transition points to the neighboring conveyor line and that is therefore designed to be endlessly circulating. The mixed-item load is passed along to the carrying tray of the upper free-running part of the chain from the neighboring conveyor line for the tilting process and is either tilted off in the direction of the branch conveyor line or passed along to the conveyor line connected to the tilting device for further transport. The tilting movement of the carrying tray takes place through a lever arm acting on the tilting arm; the lever arm essentially extends vertically downwards and has a guide roller on the end that is turned away from the tilting arm. The guide roller is run in a guide rail going along the path of motion of the chassis of the carrying trays, designed so as to be circulating and racetrack-shaped. The carrying tray is locked into its horizontal position in this way. Distributing guides are arranged along the course of the guide rail for the tilting process, in order to divert the guide roller into a tilting rail located above or below the guide rail, depending on the desired tilting direction to the right or left side. Because of the diverting of the guide roller, the lever arm is pulled down or pushed up in an appropriate way; the carrying tray is thereby tilted to the right or to the left. The changeover of the distributing guides takes place through a double-action pneumatic cylinder. Its horizontally directed movement is turned into a swiveling of the distributing guides in the vertical direction through 2 rollers, each working in a combined action with a link guide.

This tilting device for mixed-item loads is only suitable for tilting off a piece of the mixed-item load onto a preselected branch conveyor, however. Utilizing it for specifically emptying containers is not possible.

The problem of creating a tilting device for emptying containers of mixed-item loads, especially of pieces of airline luggage, which has an optimal operational throughput, is at the root of the invention at hand.

SUMMARY OF THE INVENTION

This problem is solved in the case of a tilting device for emptying containers of mixed-item loads by the characteristics specified in claim 1. Advantageous design variations of the invention are indicated in dependent claims 2 through 11.

In accordance with the invention, the assignment of at least two tilting arms to a container during the entire tilting process, and consequently the reset movement of the tilting arm into the horizontal position with the container as well, is achieved because of the design of the tilting arms to move along in the transport direction. Having to provide additional time for the resetting of the tilting arms is thereby avoided. The operational throughput, or the length of the tilting device, is optimized in this way. Operational throughputs of 2500 containers per hour can be achieved with a tilting device of this type.

The tilting arms are expediently guided via chassis in a running rail and are driven via an endlessly circulating traction mechanism, preferably a chain. This design form leads to a low overall height of the tilting device.

The arrangement of permanent magnets at the ends of the tilting arms, as well as of a material that can be held by the magnetic force, especially steel sheeting, on the bottom of the container floor, proves to be a particularly advantageous manner of fastening the containers on the tilting arms if the container is made of plastic. The connection of the permanent magnets with the container can be easily released at the end of the tilting device through the downwards tilting movement of the tilting arms, and the container can be securely passed along to the subsequent conveyor line.

A gentle coupling to, and decoupling from, the container is achieved through the tilting movement of the permanent magnets, viewed in the transport direction and taking place at the beginning and the end of the tilting device, around an axle oriented crosswise to the direction of transport into or out of its essentially horizontal position on the tilting arms. Furthermore, contact of the holding agent with the bottom of the container that is across as much of the surface as possible and a secure holding of the containers on the tilting arms, and also during the tilting movement, are achieved because of the disk-shaped design of the holding agents; a disk surface is turned towards the container to be coupled, and the supplemental positioning of the holding agents on the tilting arms, so as to be slightly movable in an angular direction, brings this about.

It also turns out to be advantageous to provide the chassis with runners that roll down running rails, which take a course that is racetrack-shaped, viewed crosswise to the direction of transport, and the traction mechanism with the chassis located on it is guided through two deflection wheels located in the area of the ends of the running rails.

To carry out the tilting movement of the containers, a lever arm is flexibly supported on every tilting arm, outside of its axis, which essentially has a vertical orientation and which has a guide roller on the end turned away from the tilting arm. This guide roller engages in a guide rail running parallel to the racetrack-shaped running rail to hold the tilting arm in its horizontal transport position. For the swiveling of the tilting arms, distributing rails are provided along the course of the guide rails; the distributing rails can be swiveled around a distributing joint with an axle oriented crosswise to the direction of transport and horizontal and can be diverted through the guide rollers from the guide rail into a tilting rail vertically displaced with regard to the guide rail. Because of the pulling or pushing force acting on the lever arm in this way in the vertical direction, the tilting arm and consequently the container attached to it will be swiveled to either one side or the other of the tilting device. This design of the tilting mechanics proves to be very simple in a construction design sense, because it is essentially based on mechanical components. The susceptibility to malfunction of a mechanical solution of this type is also very low.

The arrangement of a distributing rail that can be swiveled around a distributing element along the course of the guide rail has proven to be an advantageous design form of the distributing elements. The distributing rail has a length in connection with this that corresponds approximately to the length of the container. A relatively gentle tilting movement of the tilting arms, and consequently of the tilting container, is possible because of this. The distributing rail can be swiveled out of its horizontal neutral position into its operating position through a drive unit. In the operating position, the distributing rail connects the guide rail with a tilting rail assigned to this.

The use of a planar cam drive with prismatic and revolute joints along the lines of a Geneva stop has proven to be advantageous as a drive unit for the swiveling movement of the distributing rail. This is due to the fact that it is ensured because of this that the drive unit, which is preferably designed as an electromotor with gearing preceding it, is not subjected to rotational stress in the neutral position and even in the operational position of the tilting rail, and the supporting forces of the distributing rail can be directly passed into the drive shaft of the gearing. The cam drive consequently proves to be self-locking.

This cam drive is realized by a pin disk located on the drive shaft that essentially consists of a pin located at an offset to the drive shaft; the pin engages in a slot of a slotted disk that can be rotated coaxially to the pin disk. A connection rod is flexibly supported at the end of the slotted disk opposite the slot; the connection rod is connected to the distributing rail and has the task of converting the rotational movement of the slotted disk into a lifting and lowering movement of the distributing rail. So that the previously-described self-locking of the cam drive is possible, curved bearing faces are provided on the pin disk and on the slotted disk; the bearing faces lie together in the operating position and neutral position of the pin disk and slotted disk and consequently take the stress off the pin. Between the two positions, the pin disk can be swiveled by 90° and, in both swivel positions of the pin disk, the slot is arranged in each case with its lengthwise extension tangential to the shaft of the pin disk and at a distance to this shaft.

Furthermore, it proves to be advantageous to provide a double set of guide rails and tilting rails that are located on the right and left side beneath the running rails, viewed in the direction of transport. It is possible because of this to provide a distributing element on the left side and a further distributing element following shortly after that, in the direction of motion, on the right side in each case at the beginning of the running rails of the tilting device. The spacing of the distributing elements corresponds to the spacing of the successive tilting arms, which jointly support a container in each case; their simultaneous swiveling is possible because of this. It is possible, due to the laterally-displaced arrangement of the distributing elements, to increase the speed of the chassis because the spacings between the individual guide rollers is doubled on one side of the guide rails and tilting rails, and consequently sufficient time is left to switch the distributing rails into the desired position before the next guide roller arrives, even at higher conveyor speeds. The tilting arms are each arranged so as to be twisted by 90° on the chassis for this and the guide rollers are each provided so as to alternately engage in the right rails or in the left rails, viewed in the direction of transport.

The invention is explained more closely below with the aid of a design example.

DETAILED DESCRIPTION OF THE PREFERRED EMBODIMENTS

Figure 1:
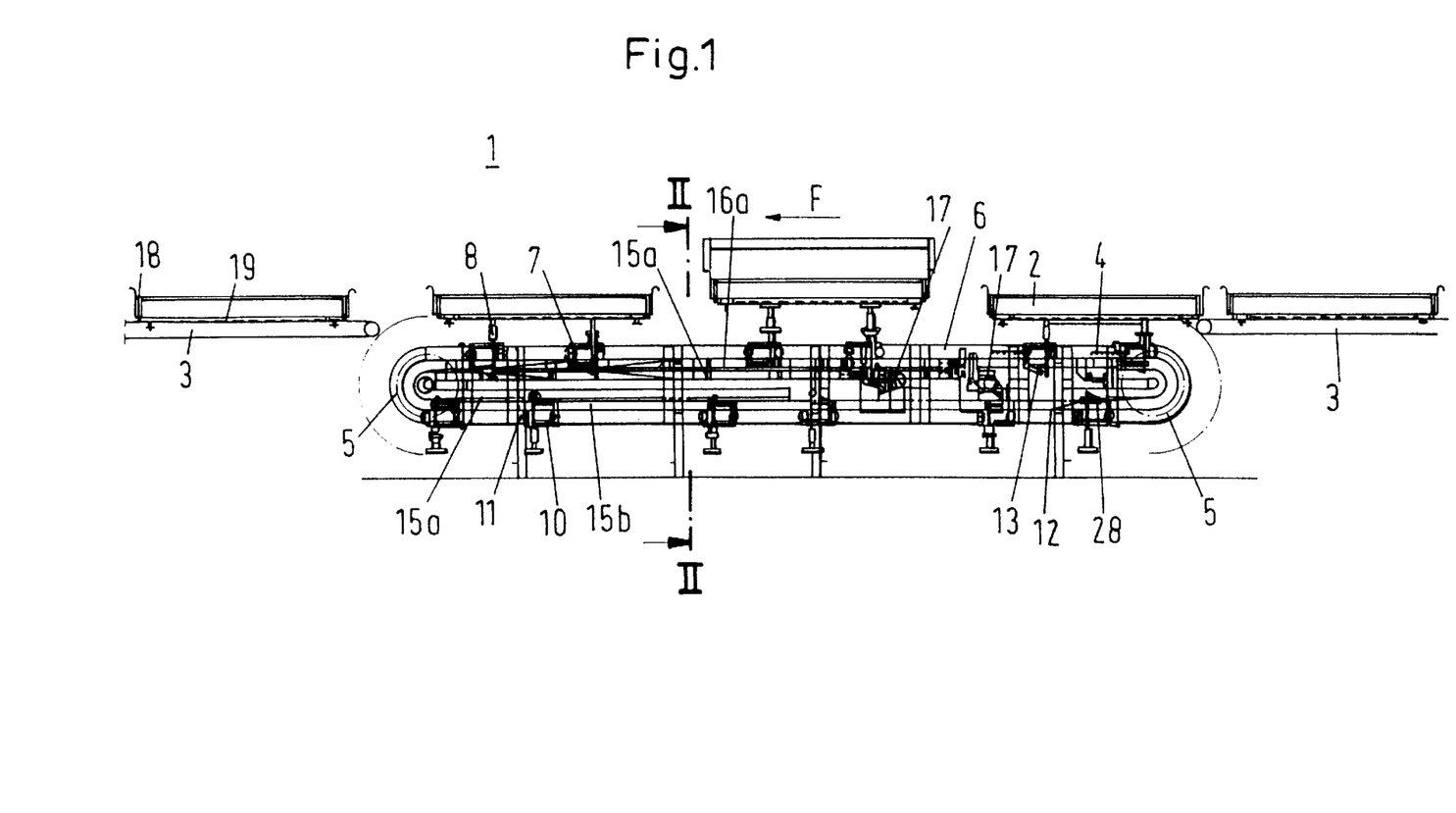
FIG. 1 shows a side view of a tilting device for containers, in accordance with the invention, arranged along the course of a belt conveyor.

In FIG. 1, a side view of a tilting device 1 in accordance with the invention for emptying containers 2, especially transport containers for pieces of airline luggage, is presented. The tilting device 1 is arranged along the course of a conveyor line 3, which is preferably designed as a belt conveyor, on which the transport containers are laterally taken off by one belt each. The conveyor line 3 is for supplying and carrying away the containers 2 to or from the tilting device 1. The tilting device 1 has the task of laterally swiveling the containers 2 to one side and crosswise to the direction of transport F, in order to deliver the transport goods conveyed by the containers 2 to branch conveyors, which are not shown and which are preferably designed as chutes.

The tilting device 1 essentially consists of an endlessly-circulating traction mechanism 4 that is guided at the beginning and at the end of the tilting device 1 through deflection wheels 5, which are supported so as to be capable of rotating around horizontal axles running crosswise to the direction of transport F. The traction mechanism, which is only partially shown, is preferably designed as a chain and, accordingly, the deflection wheels 5 as gear wheels. The traction mechanism 4 is guided between the deflection wheels 5 by running rails 6 (also see FIG. 3 and FIG. 4), which extend in the direction of transport F and which are open at the sides. The guide surfaces of the running rails are preferably made of plastic. Chassis 7 are attached to the traction mechanism 4 by bolts; the chassis can consequently be driven in the direction of transport F in the area of the upper free-running part of the traction mechanism 4. A multitude of chassis 7 are arranged along the traction mechanism 4; the spacing of the chassis to each other is chosen in such a way that two successive chassis 7 in the direction of transport F form a pair in each case, each of which carries a container 2. Every pair is spaced from one another in dependence on the length of the container 2, while maintaining a minimum spacing to the succeeding container 2. A tilting arm 8 is attached to every chassis 7 for the swiveling process of the containers 2; the tilting arm can be swiveled around an axle 9 (see FIG. 2 and FIG. 3) that runs in the direction of transport F and horizontally.

The chassis 7 essentially consists of a frame 10 on which the tilting arm 8 is supported via an axle 9. This description refers to a chassis 7 that moves in the direction of transport F in the area of the upper free-running part of the traction mechanism 4. Furthermore, the chassis 8 has four rollers 11 that, viewed in the direction of transport F, are arranged in pairs in each case, one behind the other, and consequently also next to each other (also see FIGS. 2 and 3). The rollers 11 roll down running rails 6 that are arranged on the tilting device 1 so as to run along the traction mechanism 4. Viewed from the side, the running rail 6 has a racetrack-shaped design, i.e. this consists of two parallel, straight rails lying opposite each other; the ends of the rails are connected with each other through a semicircular rail in each case.

The tilting movement of the tilting arms 8 takes place through a coupling rod 12, which is supported on the tilting arm 8 so as to be capable of swiveling via an axle 13 (see FIGS. 2 and 3) of a joint head running in the direction of transport F and which essentially extends vertically downwards. A guide roller 14 is arranged on the end of the coupling rod 12 turned away from the tilting arm 8; the guide roller engages in a running rail 15a, 15b running in parallel to the running rail 6 and consequently also racetrack-shaped. In order to move the tilting arms 8 out of their horizontal transport position into their tilted position, tilting rails 16a, 16b are provided in parallel to the running rails 15a, 15b and running above or beneath these. The running rails 15a, 15b and the tilting rails 16a, 16b are connected with each other through distributing elements 17a, 17b. An initiation of the swiveling movement of the tilting arms 8 is consequently possible by switching over the distributing elements 17a, 17b, because there is either a push upwards or a pull downwards through the diversion of the guide roller 14 from the running rail 15a, 15b to the assigned tilting rail 16 of the coupling rod 12, and the tilting arm 8 is consequently swiveled.

Figure 2:
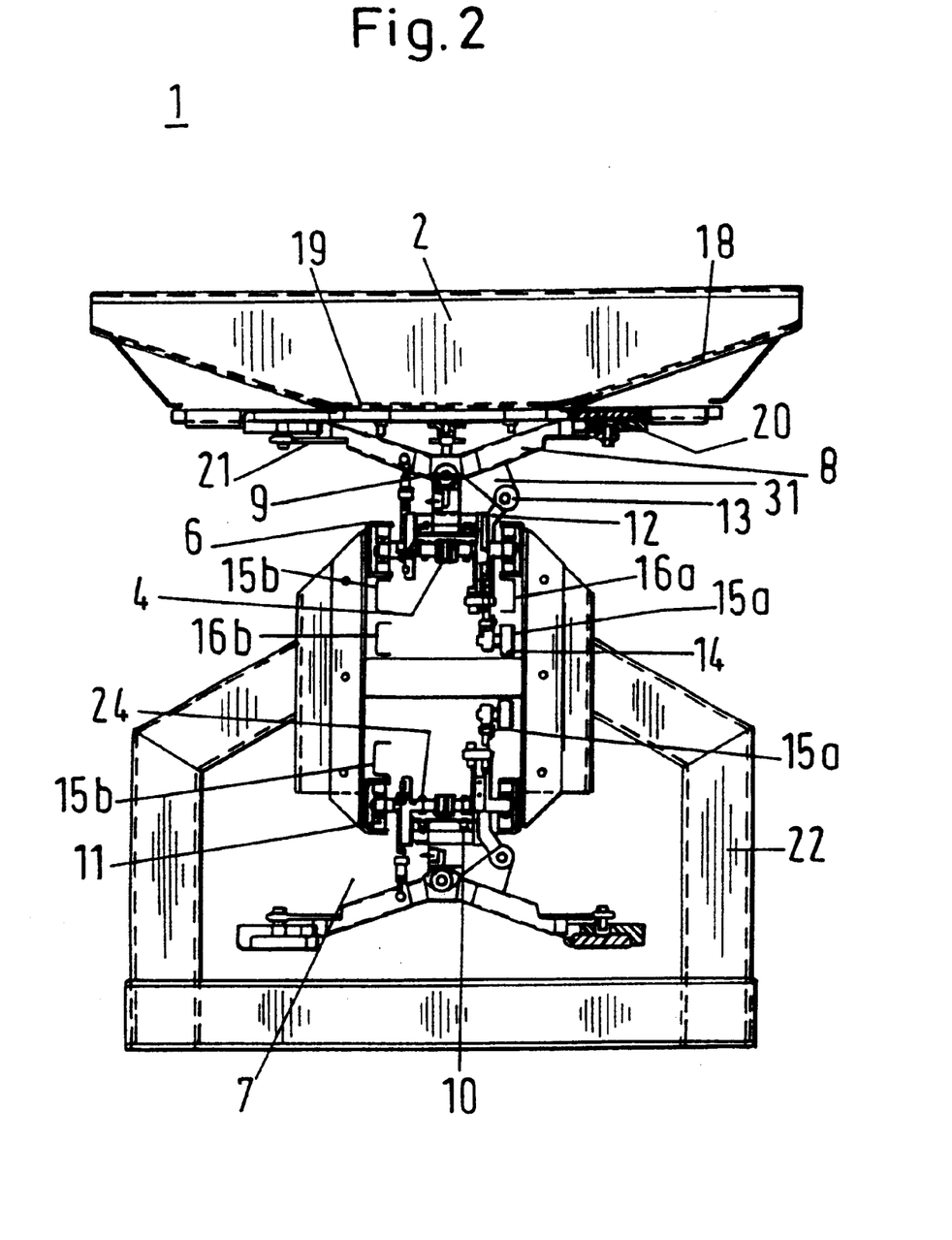
FIG. 2 shows a sectional view of FIG. 1, along the cut line II—II.

FIG. 2 shows an enlarged sectional view of FIG. 1 along the cut line II—II, from which the design of the containers 2 is to be noted, among other things. These containers 2 are especially suited for transferring out the transported conveyor goods, in the form of suitcases, backpacks or bags, by tilting to around 45°. Trough-shaped means here that the containers 2 have side walls 18 oriented crosswise to the direction of transport F; the side walls are oriented so as to be nearly perpendicular to the floor 19 of the container 2, in order to prevent the transport goods from leaving the container 2 during the transport of the containers 2 on the conveyor lines 3 in ascending sections, descending sections and curves. In the design example at hand, the inner side walls 18 of the container 2, which are oriented towards the direction of transport F, are more or less arranged with an angle of 20° to the floor 19. This slanted design of the sidewall 19 encourages a sliding out of the transport goods onto the neighboring branch line when the container 2 tilts.

The containers 2 are locked together with the tilting arm 8 via holding devices 20 on the tilting device 1 during the transport movement in the direction of transport F. At the same time, the container 2 rests with its floor 19 on the tilting arm 8. The holding devices 20 are preferably designed as permanent magnets, and the container, which is preferably made of plastic, is accordingly provided with a profiled steel sheet in the area of the exterior of its floor 19. The profiled steel sheet moreover serves to protect the container 2 made of plastic.

It is also possible to design the holding devices 20 as a mechanical latch and to provide corresponding recesses on the container 2 or to use electromagnets.

Furthermore, it can be noted from FIG. 2 that the running rails 6 for the chassis 7 are composed of two U-shaped sections that are placed standing upright and with their open sides turned towards each other, and laterally arranged with the exterior of the flange on a supporting frame 23. The rollers 11 of the chassis 7 each roll on the lower land of the U-shaped running rails 6. The diameter of the runners 11 is chosen in such a way that a slight gap remains to the upper land of the running rail 6 when there are runners 11 resting on the lower land of the running rail 6. It is possible because of this, on the one hand, that the rollers 11 can travel in the running rail 6 without jamming and, on the other hand, the tilting moment applied to the chassis 7 can be taken up by these because of the lateral shifting of the container 2 during the tilting process by the runner 11 turned away from the protruding part of the tilting arm 8 lifting from the lower land of the running rail 6 and setting down directly after this on the upper land of the running rail 6. The forces resulting from the tilting moment are securely passed along into the running rail 6 and the supporting frame because of this. The runners 11 of the chassis 7, which lie next to each other, are supported on sections of a carrying axle 23, placed in a coaxial manner with respect to each other in each case; the carrying axle is connected with the frame 10 of the chassis 7 between the runners 11. The frame 10 is connected to the traction mechanism 4 by means of carrier elements with pins 24 that extend in the direction of the supporting frame 22 as well as downwards—viewed in reference to the upper chassis 7. In the case that the traction mechanism 4 is designed as a tooth-type chain, it is a matter of laterally extended pins for the link plates in the case of the pins 24.

The tilting arm 8 essentially consists of a profile section that extends crosswise to the direction of transport F; the profile section is supported in the center of its lengthwise extension on an axle 9 running in the direction of transport F and consequently on the frame 10 of the chassis 7. Each of the holding devices 20 are placed at the ends of the tilting arms 8 and in extension of these. The holding devices 20 designed as permanent magnets are connected with the tilting arm 8 through connection elements 21, especially steel sheet strips, that have limited flexibility. It is possible, because of the flexible attachment, for the surface of the holding device 20 to set down across its full surface on the underside of the floor 19 of the container 2. The holding power of the holding device 20 is optimized because of this. It is also possible to support the magnets in a pot-shaped plastic element and to firmly connect this with the tilting arm 8, or to directly connect the holding devices 20 with the tilting arm 8.

Furthermore, the arrangement of the guide rails 15a, 15b and of the tilting rails 16a, 16b can be noted from FIG. 2. It is evident that a pair of guide rails 15a, 15b are provided with tilting rails 16a, 16b in the area of the upper free-running part of the traction mechanism 4 in each case, beneath the running rails 6 in each case, viewed in the direction of transport F. Only one guide rail 15a, 15b and no tilting rail 16a, 16b is located on each side of the tilting device 11 in the area of the lower free-running part of the traction mechanism 4. In FIG. 2, a chassis 7 with a tilting arm 8 is presented, the coupling rod 12 of which engages through its guide roller 14 in the guide rail 15a, which is located on the right side, viewed in the direction of transport F, and if necessary in its assigned tilting rail 16a. The chassis 7 with the tilting arm 8, following in the direction of transport F, is arranged in a mirror image to the chassis 7 presented in FIG. 2; both tilting arms 8 form a pair in order to support a container so that the coupling rod 12 is linked on the left-hand side of the tilting arm 8, designed as a double arm, over its axle 13. This other chassis 7 of the pair is presented in FIG. 3 in a swiveled, tilted position.

For the joint swiveling movement of the two tilting arms 8, which jointly support a container 2 in each case, the tilting arm 8 which is in the front with regard to the direction of transport F can be swiveled by the guide roller 14 being deviated from the lower, or inner as the case may be, guide rail 15 on the right-hand side via a distributing element 17a (see FIGS. 4 and 5) into the tilting rail 16a located between the guide rail 15a and the running rail 6. The coupling rod 12 is moved upwards in the vertical direction because of this, and the tilting arm 8 is swiveled to the left around the axle 9 by around 45°.

Because no swiveling of the tilting arms 8 is necessary in the area of the lower free-running part of the traction mechanism 4, only one guide rail 15a is placed on the right-hand side and one guide rail 15 on the left-hand side, offset upwards.

Figure 3:
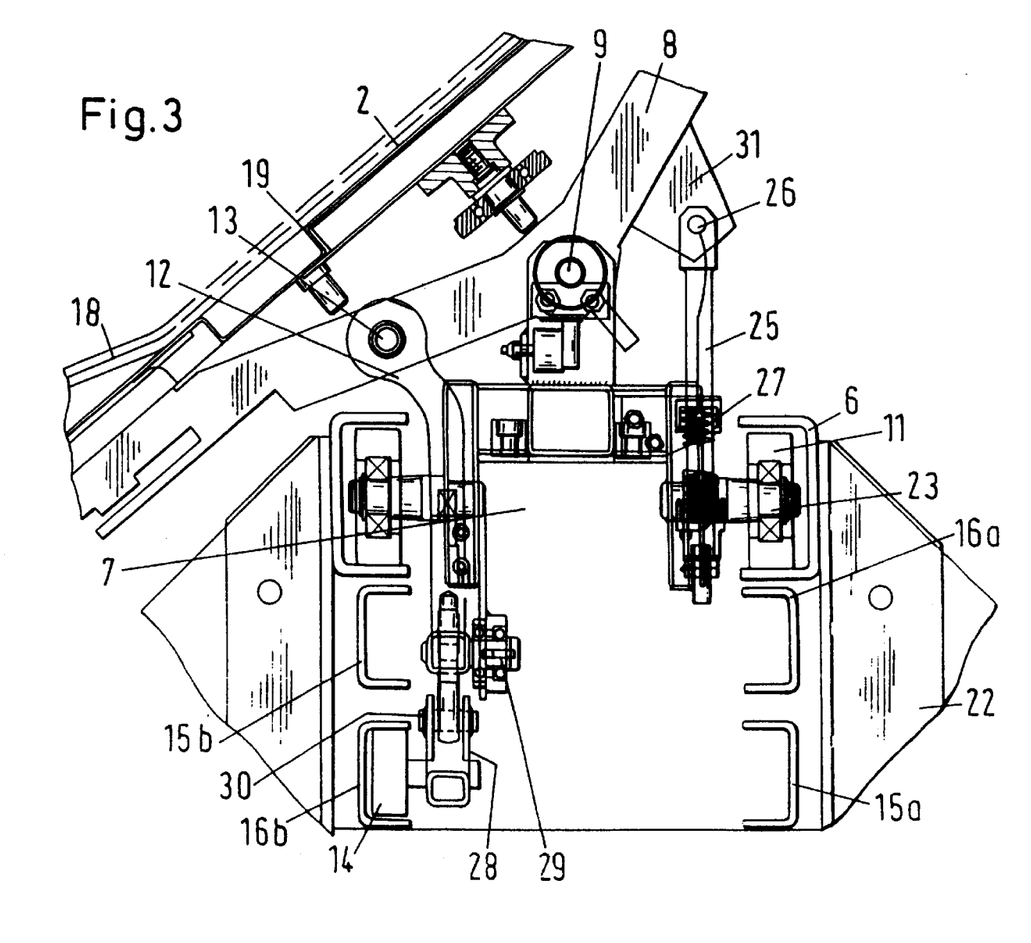
FIG. 3 shows an enlargement of a cutout area of FIG. 2 from the area of the tilting drive unit, but in the tilted position of the tilting arm.

In comparison to FIG. 3, which shows an enlargement of a cut-out section of FIG. 2 from the area of the tilting drive unit, but for the rear chassis 7, viewed in the direction of transport F, with a tilting arm 8 of the pair of tilting arms 8, it is evident that the guide rail 15b and the tilting rail 16b, located on the left-hand side when viewed in the direction of transport F, are reversed with each other vis-à-vis the right-hand side. The tilting rail 16b is consequently located beneath the guide rail 15b. This arrangement can also be noted from FIG. 2, where it can be seen in the area of the lower free-running part of the traction mechanism 4 that the guide rail 15b is placed on the left-hand side in the neighboring area and nearly bordering on the running rail 6, and the guide rail 15 is offset upwards on the right-hand side in the vertical direction by approximately the height of a tilting rail 16 plus a gap from the upper side of the lower running rail 6.

Further, it can be noted from FIG. 3 that a connecting rod 25 is supported so as to be able to swivel on an axle 26 running in the direction of transport F on the side of the tilting arm 8 designed as a double arm, which is turned away from the coupling rod 12. The connecting rod 25 is essentially oriented vertically in all of the positions of the tilting arm 8 and is supported on the end turned away from the tilting arm 8 through a spring element 27 on the frame 10 of the chassis 7. This spring element 27 has the task of providing initial tension to the tilting arm 8 vis-à-vis the frame 10 of the chassis 7, so that the guide roller 14 runs down in each case on the upper flange of the guide rail 15a, 15b, designed to be U-shaped and to be open on the side, or the tilting rail 16a, 16b in the horizontal transport position, on the one hand, and also in the slanted tilt position. The tilting arm 8 is stabilized because of this during the entire tilting process and even during the return in the area of the lower free-running part of the traction mechanism 4.

Further, FIG. 3 shows that the guide roller 14 is connected through a drag arm 28 with the end of the coupling rod 12 turned away from the tilting arm 8 via an axle 29. This drag arm 28 can likewise be found in the side view of FIG. 4. The axle 29 is oriented so as to be crosswise to the direction of transport F and horizontal. With regard to the support of the coupling rod 12 on the drag arm 28, it can be noted in FIGS. 3 and 4 that this takes place through an axle 30 oriented so as to be crosswise to the direction of transport F. The axles 13 and 30 are each components of ball-and-socket joints, in order to balance out the displacements that arise during the three-dimensional movement of the tilting arm 8 during the tilting process. Being able to do without additional guiding of the coupling rod 12 in the vertical direction is achieved by the connection of the guide roller 14 through the drag arm 28 with the frame 10 and the engagement of the coupling rod 12 on the drag arm 28 above the bearing arrangement of the guide roller 14. The guide roller 14 and the drag arm 28 are pulled along behind the chassis 7 because of the linking of the drag arm 28 in the front, viewed in the direction of transport F, on the frame 10. This type of movement of the guide roller 14 in the guide rail 15 and the tilting rail 16 increases the stability of the joint connection of the drag arm 28 and the coupling rod 12 among each other.

Moreover, it is evident by a comparison of FIGS. 2 and 3 that a connecting sheet 31 is additionally located on a lever side of the tilting arm 8; either the connecting rod 25 or the coupling rod 12 is connected with the tilting arm 8 through the connecting sheet, depending on whether the front or the back tilting arm 8 of the pair of tilting arms 8 is involved in each case for the transport of a container 2. Being able to use identically designed coupling rods 12 is achieved because of this, even though the guide rail 15a, 15b and the tilting rail 16a, 16b are exchanged for each other, and consequently offset vertically, on the two opposite sides.

Figure 4:
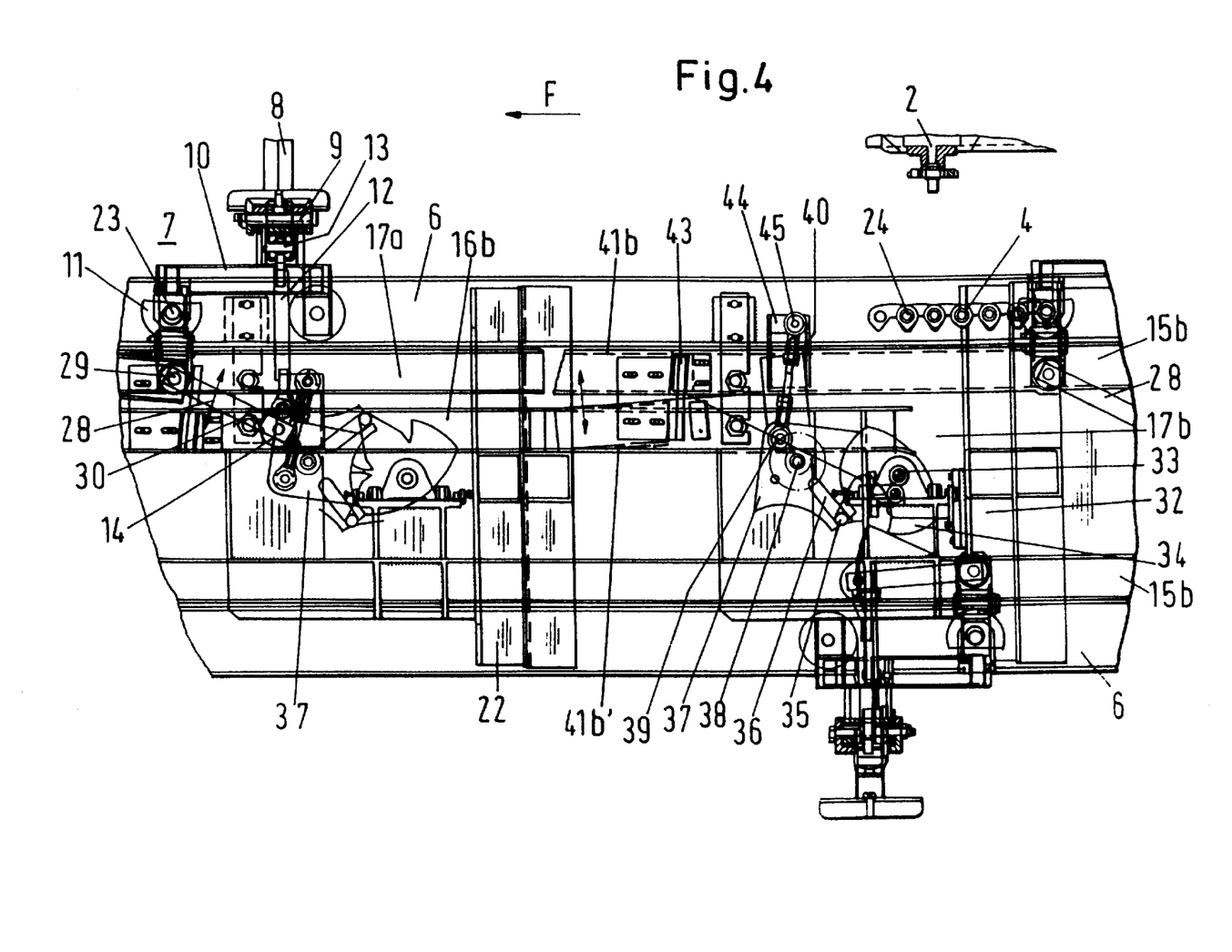
FIG. 4 shows an enlargement of a cutout area of FIG. 1 from the area of the distributing elements.

FIG. 4 shows an enlargement of a cut-out section of FIG. 1 from the area of the two successive distributing elements 17a and 17b, in the direction of transport F, which essentially consists of a drive unit 32 (see FIG. 6) and a planar cm drive with prismatic and revolute joints along the lines of a Geneva stop. The drive unit 32 consists of an electromotor with gearing preceding it. The drive unit 32 is supported on the supporting frame 22 of the tilting device 1 and connected on the drive unit side through a shaft 33, oriented crosswise and horizontal to the direction of transport F, with a pin disk 34 supported on this. The pin disk 34 has the function of a lever arm supported on one side of the shaft 33, the end of the lever arm turned away from the shaft 33 is provided with a pin 35, which is oriented coaxially to the shaft 33. The pin 35 is preferably provided with a roller. The pin 35 engages in a slot 36, open on one side and having an oblong shape, of a slotted disk 37, which is supported so as to be able to rotate around a further shaft 38 oriented coaxially to the shaft 33 of the pin disk 34. The slotted disk 37 is designed in a square shape as a first approximation, supported off-center on the shaft 38, and has two concave bearing surfaces 37', for self-locking of the cam drive unit in its end positions. With regard to function, the slotted disk 37 is designed as a double lever; the slot 36 is located on the one lever arm. The imaginary extension of the slot centrally cuts the shaft 38. A connecting rod 40 is supported on the opposite lever arm of the slotted disk 37, and consequently on the side opposite the slot 36, through an axle 39 oriented so as to be coaxial to the shaft 38. The end of the connecting rod turned away from the axle 39 is attached through a further axle 45, oriented to be parallel to the axle 35, to a distributing rail 41. The pin-slot connection is for swiveling the distributing rail 42; the fixing of the distributing rail 42 in the end positions takes place through the bearing surfaces 34', 37'.

This distributing rail 41 has a length extending in the direction of transport F that is approximately within the range of the length of a container 2 and can be swiveled into its operating position through a distributing joint 42 from its neutral position, in which this is located along the course of the guide rail 15b. The distributing rail 41b connects the guide rail 15b with the tilting rail 16b in the operating position and is set up with a descending slope, viewed in the direction of transport F. The distributing joint 42 for the distributing rail 41b is not presented in FIG. 4, because this is outside the right edge of the drawing due to the length of the distributing rail 41b, because of which a gentle tilting movement of the containers 2 is achieved. The distributing joint 42 for the distributing rail 41a can, however, be found in the top view of FIG. 4 in FIG. 6. The distributing rail 41 is designed with two parts in the design example, in order to reduce its length. A first part is connected with the distributing joint 42, and a second part 41a is attached in a fixed manner to the beginning of the tilting rail 16b. The second part 41b is, in accordance with the orientation of the first part in the operating position, oriented so as to be at an angle to the tilting rail 16.

The distributing guide 41b is presented in its horizontally-running neutral position in FIG. 4; the operating position of the distributing rail 41b is only indicated by the drawn-in, fixed end 41b'. Furthermore, it can be noted from FIG. 4 that the distributing rail 41b next to the distributing joint 42 is also additionally held in the vertical direction on its end turned away from the distributing joint 42 and consequently at the front, viewed in the direction of transport F, through guide elements 43. The guide elements 43 consist of a U-shaped piece, which is attached to the supporting frame 22, and its open side is oriented towards the front, viewed in the direction of transport F. A strip-shaped element, which is attached to the distributing rail 41, engages in the opening. The connecting rod 40 engages on the distributing rail 41b close to the guide elements 43 and at a distance from the distributing joint 42.

Moreover, the corresponding design of the distributing rail 41a of the distributing element 17a can be noted from FIG. 4. The distributing rail 41a is also presented in its neutral position here as well, and the operating position is only alluded to by the front end of the fixed part o the distributing rail 41a', lying in the direction of transport F. The slot 36 of the slotted disk 37 of the distributing element 17a is shown here in its two possible positions.

The manner of functioning and the advantages of the drive unit 32 of the distributing element 17 are explained in more detail below with the aid of FIG. 5, which shows an enlargement of a cut-out section of FIG. 4 from the area of the distributing element 17b. The distributing rail 41b is located in its raised and horizontal neutral position, so the guide roller 14 of the coupling rods 12 of the chassis 7 are guided along the guide rail 15b, and the tilting arm 18 is consequently in its transport position. In this neutral position, the distributing rail 41b is held via the connecting rod 40, which is connected in an articulated way for this with the distributing rail 41b through an assembly angle 44 and the axle 45 and is supported on one end of the slotted disk 37, which is held in its neutral position through bearing surfaces 34', 37', of the slotted disk 37 and the pin disk 34, lying one on the other. Because the slot 36 is oriented with its lengthwise extension tangential to the shaft 33 in the operating position and also in the neutral position of the distributing rail 41b, forces in the direction of the shaft 33 are only passed along through the bearing surfaces 34', 37' into the pin disk 34, and the forces consequently do not subject the drive unit 32 to rotational stress. This cam drive unit is consequently designated self-locking.

The lever relationships on the slotted disk 37 are chosen in alignment with the adjustment path of the distributing rail 41b in such a way that, even in the operating position of the pin disk 34 and of the slotted disk 37 (see FIG. 4, distributing elements 17a), the slot 36 is oriented with its lengthwise extension tangential to the shaft 33, and the bearing surfaces 34', 37' lie one on the other. By twisting the pin disk 34 by 90°, the distributing rail 41 is consequently capable of being swiveled out of its operating position into its neutral position or vice versa. The gearing connection of the distributing rail 41 through the pin disk 34 and the slotted disk 37 has, moreover, the advantage that a low starting moment is required, especially in the case of a drive unit 32 designed in the form of an electromotor, because the pin 35 is moved relatively freely at first in the direction of the lengthwise extension of the slot 36 at the start of its movement, and the share of forces to transfer to the side walls of the slot 36 only increases with an increasing swiveling of the pin disk 34.

Figure 5:
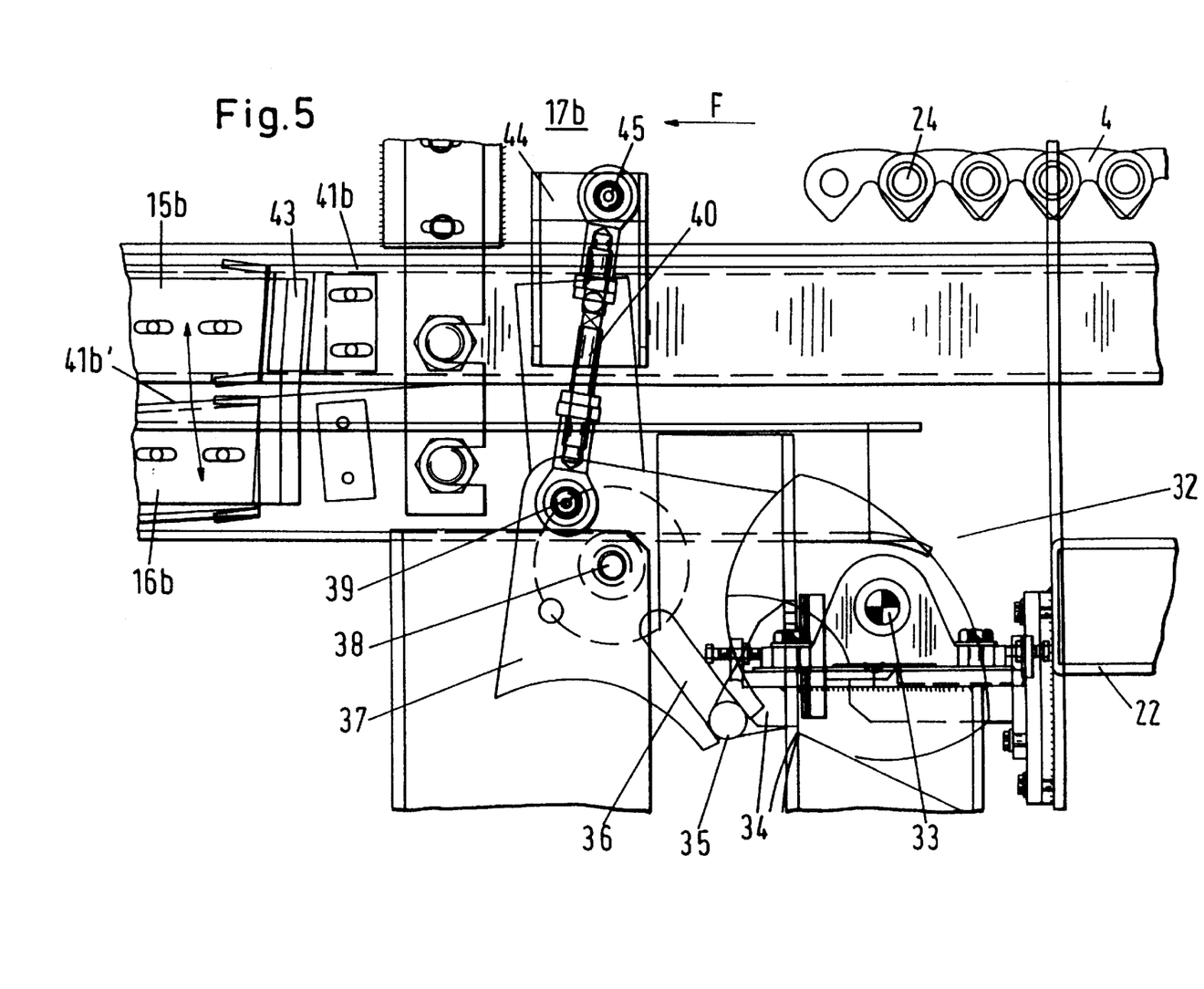
FIG. 5 shows an enlargement of a cut-out area of FIG. 4 from the area of a drive unit of a distributing element and FIG. 6 shows a top view of FIG. 4.

Furthermore, FIG. 5 shows that the connecting rod 40 can be adjusted as to its length. The transition between the end of the distributing rail 41 and the beginning of the guide rail 15 or of the tilting rail 16 can be easily adjusted because of this.

Figure 6:
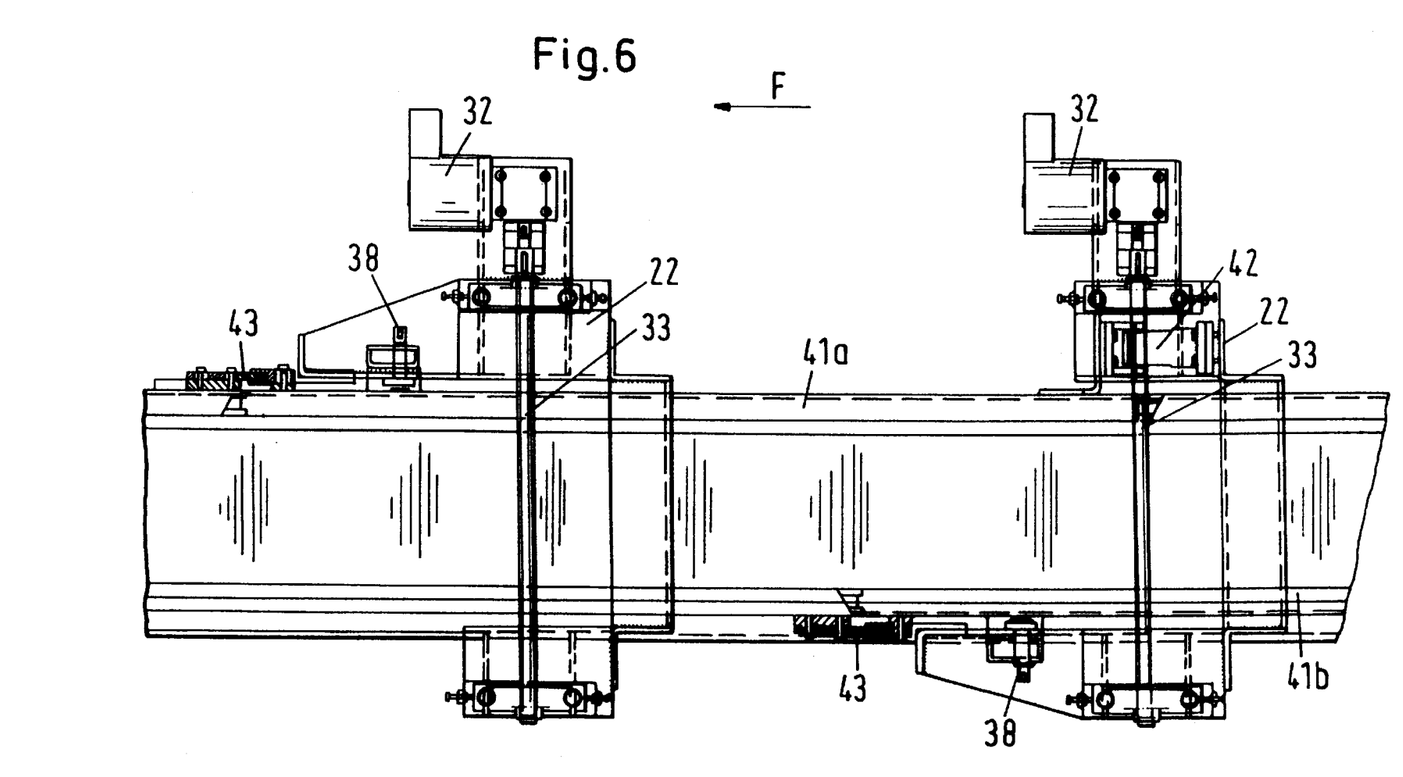

Moreover, it can be noted from FIG. 6, which shows a top view of FIG. 4, that the distributing joint 42 is designed as a hinge joint. This hinge joint has a swivel axis oriented horizontally and crosswise to the direction of transport F and essentially consists of an arm-shaped bearing element on the supporting frame 22, which has a bore hole for an axle on its end that is turned away from the supporting frame 22. A fork-shaped joint part is pushed on the axle at the ends projecting from the fastening element; the joint part is connected through an angled piece with the distributing rail 41a.

The embodiments of the present invention in which an exclusive property or privilege is claimed are defined as follows:

1. A tilting device for emptying containers of mixed-item loads which is placed along the course of a conveyor line and at least one branch conveyor bordering the conveyor line, comprising:

tilting arms located one behind the other in a direction of transport, the tilting arms able to be laterally swiveled for emptying the load from the container onto the branch conveyor around a substantially horizontal axle running in the direction of transport;

a plurality of chassis connected in an endlessly circulating chain through a driven traction mechanism, said tilting arms being located on said chassis and said containers being adapted to be coupled and decoupled with the chassis, each said chassis being movable in the direction of transport for the passing along of the containers between the conveyor lines via at least two of said tilting arms, for acceptance from and discharge to the conveyor line, each of the containers resting in the coupled state on the movable tilting arms, and;

holding devices arranged on the tilting arms being designed as permanent magnets, wherein the containers are magnetic, at least in the area of their contact surface.

2. A tilting device according to claim 1 wherein the traction mechanism is guided via two deflection wheels which are each located in an area of transition between the branch conveyor and the conveyor line and which can be rotated around horizontal axles so that the holding devices essentially move from below, towards, or away from the contact surface of the container for coupling or decoupling during the acceptance or discharge of the containers.

3. A tilting device according to claim 1 wherein the holding devices are designed in a disk shape, with one disk surface turned towards the container to be coupled and being supported on the tilting arm with limited angular mobility.

4. A tilting device according to claim 2 wherein the holding devices are designed in a disk shape, with one disk surface turned towards the container to be coupled and being supported on the tilting arm with limited angular mobility.

5. A tilting device according to claim 1 wherein the holding devices are arranged on the lateral ends of the tilting arms.

6. A tilting device according to claim 2 wherein the holding devices are arranged on the lateral ends of the tilting arms.

7. A tilting device according to claim 3 wherein the holding devices are arranged on the lateral ends of the tilting arms.

8. A tilting device according to claim 1 wherein exclusively one tilting arm is located on each chassis and the spacing between the two tilting arms, viewed in the direction of transport, is coordinated to the length of the containers in such a way that a container can be carried by two tilting arms.

9. A tilting device according to claim 2 wherein exclusively one tilting arm is located on each chassis and the spacing between the two tilting arms, viewed in the direction of transport, is coordinated to the length of the containers in such a way that a container can be carried by two tilting arms.

10. A tilting device according to claim 3 wherein exclusively one tilting arm is located on each chassis and the spacing between the two tilting arms, viewed in the direction of transport, is coordinated to the length of the containers in such a way that a container can be carried by two tilting arms.

11. A tilting device according to claim 5 wherein exclusively one tilting arm is located on each chassis and the spacing between the two tilting arms, viewed in the direction of transport, is coordinated to the length of the containers in such a way that a container can be carried by two tilting arms.

12. A tilting device according to claim 2 wherein the chassis have rollers that run down running rails going crosswise in a racetrack shape, viewed in the direction of transport, and the deflection wheels are arranged in the area of the ends of the running rails.

13. A tilting device according to claim 3 wherein the chassis have rollers that run down running rails going crosswise in a racetrack shape, viewed in the direction of transport, and the deflection wheels are arranged in the area of the ends of the running rails.

14. A tilting device according to claim 5 wherein the chassis have rollers that run down running rails going crosswise in a racetrack shape, viewed in the direction of transport, and the deflection wheels are arranged in the area of the ends of the running rails.

15. A tilting device according to claim 8 wherein the chassis have rollers that run down running rails going crosswise in a racetrack shape, viewed in the direction of transport, and the deflection wheels are arranged in the area of the ends of the running rails.

16. A tilting device according to claim 1, further including:

a coupling rod engaging in a flexible fashion on every tilting arm outside of its axle for the tilting movement of the containers, the coupling rod oriented substantially vertically; and a guide roller supported on its end turned away from the tilting arm, the guide roller being guided in a guide rail running parallel to the running rail to hold the tilting arms in their horizontal transport position, and the guide roller able to be diverted into a tilting rail arranged so as to be vertically offset to the guide rail for a swiveling of the tilting arms around the axle through a switchable distributing element.

17. A tilting device according to claim 2, further including:
   a coupling rod engaging in a flexible fashion on every tilting arm outside of its axle for the tilting movement of the containers, the coupling rod oriented substantially vertically; and
   a guide roller supported on its end turned away from the tilting arm, the guide roller being guided in a guide rail running parallel to the running rail to hold the tilting arms in their horizontal transport position, and the guide roller able to be diverted into a tilting rail arranged so as to be vertically offset to the guide rail for a swiveling of the tilting arms around the axle through a switchable distributing element.

18. A tilting device according to claim 3, further including:
   a coupling rod engaging in a flexible fashion on every tilting arm outside of its axle for the tilting movement of the containers, the coupling rod oriented substantially vertically; and
   a guide roller supported on its end turned away from the tilting arm, the guide roller being guided in a guide rail running parallel to the running rail to hold the tilting arms in their horizontal transport position, and the guide roller able to be diverted into a tilting rail arranged so as to be vertically offset to the guide rail for a swiveling of the tilting arms around the axle through a switchable distributing element.

19. A tilting device according to claim 5, further including:
   a coupling rod engaging in a flexible fashion on every tilting arm outside of its axle for the tilting movement of the containers, the coupling rod oriented substantially vertically; and
   a guide roller supported on its end turned away from the tilting arm, the guide roller being guided in a guide rail running parallel to the running rail to hold the tilting arms in their horizontal transport position, and the guide roller able to be diverted into a tilting rail arranged so as to be vertically offset to the guide rail for a swiveling of the tilting arms around the axle through a switchable distributing element.

20. A tilting device according to claim 8, further including:
   a coupling rod engaging in a flexible fashion on every tilting arm outside of its axle for the tilting movement of the containers, the coupling rod oriented substantially vertically; and
   a guide roller supported on its end turned away from the tilting arm, the guide roller being guided in a guide rail running parallel to the running rail to hold the tilting arms in their horizontal transport position, and the guide roller able to be diverted into a tilting rail arranged so as to be vertically offset to the guide rail for a swiveling of the tilting arms around the axle through a switchable distributing element.

21. A tilting device according to claim 12, further including:
   a coupling rod engaging in a flexible fashion on every tilting arm outside of its axle for the tilting movement of the containers, the coupling rod oriented substantially vertically; and
   a guide roller supported on its end turned away from the tilting arm, the guide roller being guided in a guide rail running parallel to the running rail to hold the tilting arms in their horizontal transport position, and the guide roller able to be diverted into a tilting rail arranged so as to be vertically offset to the guide rail for a swiveling of the tilting arms around the axle through a switchable distributing element.

22. A tilting device according to claim 16 wherein the switchable distributing element includes a distributing rail that is located in its horizontal neutral position along the course of the guide rail and can be swiveled through a drive unit into an operating position that is swiveled and that connects the guide rail with the assigned tilting rail.

23. A tilting device according to claim 17 wherein the switchable distributing element includes a distributing rail that is located in its horizontal neutral position along the course of the guide rail and can be swiveled through a drive unit into an operating position that is swiveled and that connects the guide rail with the assigned tilting rail.

24. A tilting device according to claim 18 wherein the switchable distributing element includes a distributing rail that is located in its horizontal neutral position along the course of the guide rail and can be swiveled through a drive unit into an operating position that is swiveled and that connects the guide rail with the assigned tilting rail.

25. A tilting device according to claim 19 wherein the switchable distributing element includes a distributing rail that is located in its horizontal neutral position along the course of the guide rail and can be swiveled through a drive unit into an operating position that is swiveled and that connects the guide rail with the assigned tilting rail.

26. A tilting device according to claim 20 wherein the switchable distributing element includes a distributing rail that is located in its horizontal neutral position along the course of the guide rail and can be swiveled through a drive unit into an operating position that is swiveled and that connects the guide rail with the assigned tilting rail.

27. A tilting device according to claim 21 wherein the switchable distributing element includes a distributing rail that is located in its horizontal neutral position along the course of the guide rail and can be swiveled through a drive unit into an operating position that is swiveled and that connects the guide rail with the assigned tilting rail.

28. A tilting device according to claim 22 further including:
   a cam drive along the line of a Geneva stop provided for the swiveling movement of the distributing rail through the drive unit, the cam drive having a pin disk capable of being driven and crosswise to the direction of transport, the pin disk engaging in a slot located in a slotted disk through a pin; and
   a connecting rod which converts the rotary movement of the slotted disk into a lifting or lowering movement of the distributing rail, said connecting rod supported on the slotted disk.

29. A tilting device according to claim 23 further including:
   a cam drive along the line of a Geneva stop provided for the swiveling movement of the distributing rail through the drive unit, the cam drive having a pin disk capable of being driven and crosswise to the direction of transport, the pin disk engaging in a slot located in a slotted disk through a pin; and
   a connecting rod which converts the rotary movement of the slotted disk into a lifting or lowering movement of the distributing rail, said connecting rod supported on the slotted disk.

30. A tilting device according to claim 24 further including:

a cam drive along the line of a Geneva stop provided for the swiveling movement of the distributing rail through the drive unit, the cam drive having a pin disk capable of being driven and crosswise to the direction of transport, the pin disk engaging in a slot located in a slotted disk through a pin; and a connecting rod which converts the rotary movement of the slotted disk into a lifting or lowering movement of the distributing rail, said connecting rod supported on the slotted disk.

31. A tilting device according to claim 25 further including:

a cam drive along the line of a Geneva stop provided for the swiveling movement of the distributing rail through the drive unit, the cam drive having a pin disk capable of being driven and crosswise to the direction of transport, the pin disk engaging in a slot located in a slotted disk through a pin; and a connecting rod which converts the rotary movement of the slotted disk into a lifting or lowering movement of the distributing rail, said connecting rod supported on the slotted disk.

32. A tilting device according to claim 26 further including:

a cam drive along the line of a Geneva stop provided for the swiveling movement of the distributing rail through the drive unit, the cam drive having a pin disk capable of being driven and crosswise to the direction of transport, the pin disk engaging in a slot located in a slotted disk through a pin; and a connecting rod which converts the rotary movement of the slotted disk into a lifting or lowering movement of the distributing rail, said connecting rod supported on the slotted disk.

33. A tilting device according to claim 27 further including:

a cam drive along the line of a Geneva stop provided for the swiveling movement of the distributing rail through the drive unit, the cam drive having a pin disk capable of being driven and crosswise to the direction of transport, the pin disk engaging in a slot located in a slotted disk through a pin; and a connecting rod which converts the rotary movement of the slotted disk into a lifting or lowering movement of the distributing rail, said connecting rod supported on the slotted disk.

34. A tilting device according to claim 28 wherein the slot cuts through the shaft of the slotted disk with an imaginary extension of its lengthwise extension, the pin disk is capable of swiveling, for a swiveling of the distributing rail, from its neutral position into its operating position by substantially 90°, and the slot has its lengthwise extension tangential to the shaft of the pin disk in the operating position and neutral position in each case, and at least one bearing surface located on the pin disk and the slotted disk lying one on the other for the self-locking of the cam drive.

35. A tilting device according to claim 29 wherein the slot cuts through the shaft of the slotted disk with an imaginary extension of its lengthwise extension, the pin disk is capable of swiveling, for a swiveling of the distributing rail, from its neutral position into its operating position by substantially 90°, and the slot has its lengthwise extension tangential to the shaft of the pin disk in the operating position and neutral position in each case, and at least one bearing surface located on the pin disk and the slotted disk lying one on the other for the self-locking of the cam drive.

36. A tilting device according to claim 30 wherein the slot cuts through the shaft of the slotted disk with an imaginary extension of its lengthwise extension, the pin disk is capable of swiveling, for a swiveling of the distributing rail, from its neutral position into its operating position by substantially 90°, and the slot has its lengthwise extension tangential to the shaft of the pin disk in the operating position and neutral position in each case, and at least one bearing surface located on the pin disk and the slotted disk lying one on the other for the self-locking of the cam drive.

37. A tilting device according to claim 31 wherein the slot cuts through the shaft of the slotted disk with an imaginary extension of its lengthwise extension, the pin disk is capable of swiveling, for a swiveling of the distributing rail, from its neutral position into its operating position by substantially 90°, and the slot has its lengthwise extension tangential to the shaft of the pin disk in the operating position and neutral position in each case, and at least one bearing surface located on the pin disk and the slotted disk lying one on the other for the self-locking of the cam drive.

38. A tilting device according to claim 32 wherein the slot cuts through the shaft of the slotted disk with an imaginary extension of its lengthwise extension, the pin disk is capable of swiveling, for a swiveling of the distributing rail, from its neutral position into its operating position by substantially 90°, and the slot has its lengthwise extension tangential to the shaft of the pin disk in the operating position and neutral position in each case, and at least one bearing surface located on the pin disk and the slotted disk lying one on the other for the self-locking of the cam drive.

39. A tilting device according to claim 33 wherein the guide rail, the tilting rail, and the distributing element are each provided on the right and left-hand side of the tilting device, viewed in the direction of transport, and the coupling rods each engage alternately on both sides of the tilting arms, so that the guide rollers of the successive chassis each engage alternately in the right and left guide rails and tilting rails.

40. A tilting device according to claim 16 wherein the guide rail, the tilting rail, and the distributing element are each provided on the right and left-hand side of the tilting device, viewed in the direction of transport, and the coupling rods each engage alternately on both sides of the tilting arms, so that the guide rollers of the successive chassis each engage alternately in the right and left guide rails and tilting rails.

41. A tilting device according to claim 23 wherein the guide rail, the tilting rail, and the distributing element are each provided on the right and left-hand side of the tilting device, viewed in the direction of transport, and the coupling rods each engage alternately on both sides of the tilting arms, so that the guide rollers of the successive chassis each engage alternately in the right and left guide rails and tilting rails.

42. A tilting device according to claim 28 wherein the guide rail, the tilting rail, and the distributing element are each provided on the right and left-hand side of the tilting device, viewed in the direction of transport, and the coupling rods each engage alternately on both sides of the tilting arms, so that the guide rollers of the successive chassis each engage alternately in the right and left guide rails and tilting rails.

43. A tilting device according to claim 34 wherein the guide rail, the tilting rail, and the distributing element are each provided on the right and left-hand side of the tilting device, viewed in the direction of transport, and the coupling rods each engage alternately on both sides of the tilting arms, so that the guide rollers of the successive chassis each engage alternately in the right and left guide rails and tilting rails.

* * * * *